(12) United States Patent
Matzinger

(10) Patent No.: US 10,632,864 B2
(45) Date of Patent: Apr. 28, 2020

(54) WORK VEHICLE FOR MAINTENANCE OF AN ELECTRICAL CATENARY

(71) Applicant: PLASSER & THEURER EXPORT VON BAHNBAUMASCHINEN GESELLSCHAFT M.B.H., Vienna (AT)

(72) Inventor: Nikolaus Matzinger, Linz (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 279 days.

(21) Appl. No.: 15/548,288

(22) PCT Filed: Jan. 2, 2016

(86) PCT No.: PCT/EP2016/000002
§ 371 (c)(1),
(2) Date: Aug. 2, 2017

(87) PCT Pub. No.: WO2016/124303
PCT Pub. Date: Aug. 11, 2016

(65) Prior Publication Data
US 2018/0009334 A1    Jan. 11, 2018

(30) Foreign Application Priority Data
Feb. 2, 2015   (AT) ........................ 36/2015

(51) Int. Cl.
*B60M 1/28*     (2006.01)
*B61D 15/08*    (2006.01)
*B61D 15/00*    (2006.01)
*B66F 11/04*    (2006.01)
*B66F 17/00*    (2006.01)

(52) U.S. Cl.
CPC ............... *B60M 1/28* (2013.01); *B61D 15/00* (2013.01); *B61D 15/08* (2013.01); *B66F 11/044* (2013.01); *B66F 17/006* (2013.01)

(58) Field of Classification Search
CPC . B60M 1/00; B60M 1/02; B60M 1/12; B60M 1/28; B66F 11/00; B66F 11/04
See application file for complete search history.

(56) References Cited

U.S. PATENT DOCUMENTS

| 5,161,312 A | * | 11/1992 | Theurer | ............ B60M 1/28 33/501.02 |
| 5,319,620 A |   | 6/1994  | Hohenbuchler et al. | |
| 5,573,080 A | * | 11/1996 | Theurer | ............ B61D 15/00 182/2.3 |

FOREIGN PATENT DOCUMENTS

| DE | 19957356 C1 | 8/2001 |
| EP | 0479764 A1 | 4/1992 |
| EP | 0667316 A1 | 8/1995 |

(Continued)

*Primary Examiner* — Robert J McCarry, Jr.
(74) *Attorney, Agent, or Firm* — Laurence A. Greenberg; Werner H. Stemer; Ralph E. Locher

(57) ABSTRACT

A work vehicle for maintenance of an electrical catenary includes a vehicle frame supported on on-track undercarriages and a vehicle superstructure situated on the vehicle frame. A first grounding device is disposed at a first vehicle end relative to a longitudinal direction of the vehicle. A crane having a vertically and transversely adjustable work platform is disposed at an opposite, second vehicle end. A second grounding device is provided at the second vehicle end.

9 Claims, 2 Drawing Sheets

(56) References Cited

FOREIGN PATENT DOCUMENTS

| | | | |
|---|---|---|---|
| JP | 2000335407 | A | 12/2000 |
| JP | 2001063561 | A | 3/2001 |

* cited by examiner

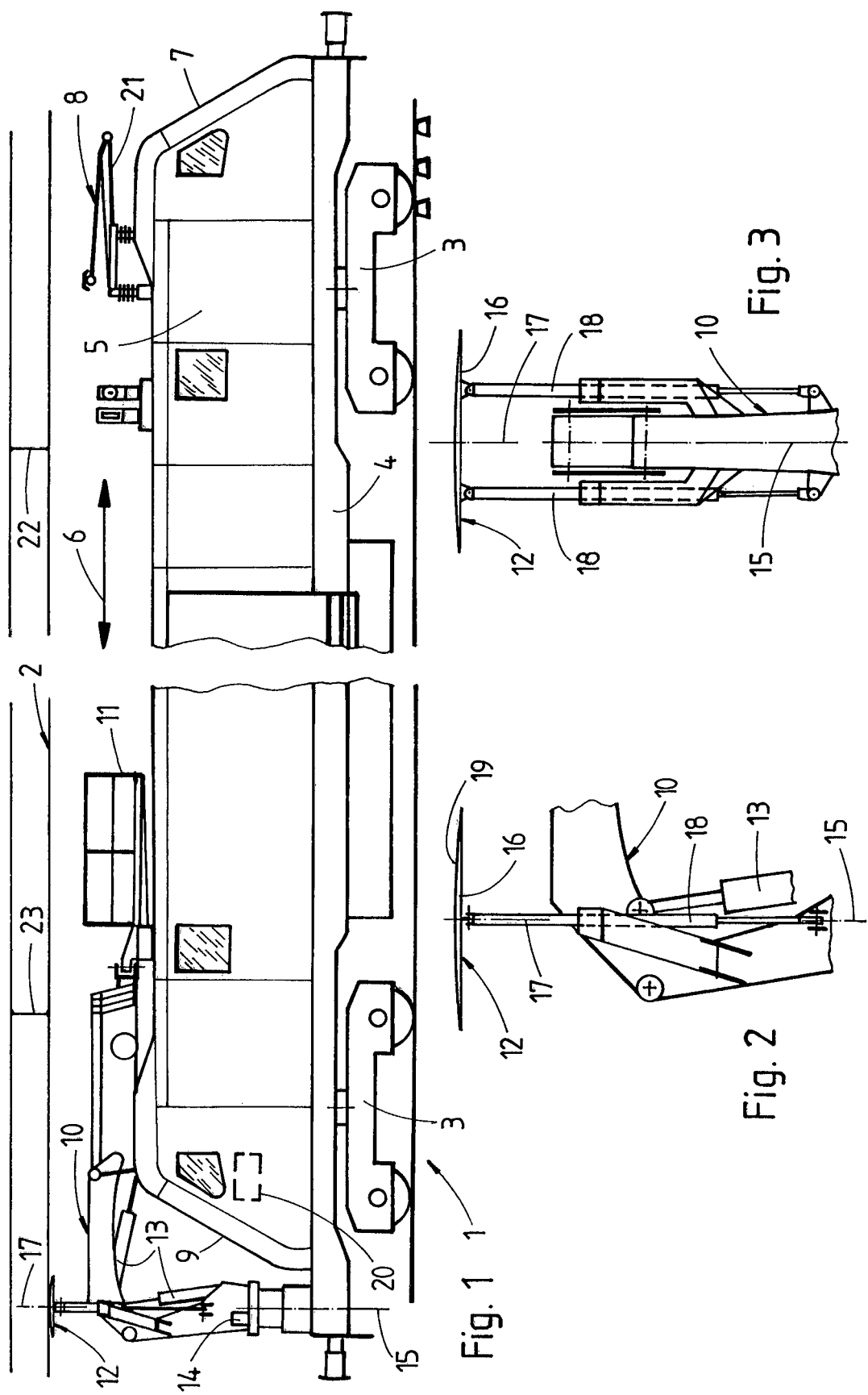

WORK VEHICLE FOR MAINTENANCE OF AN ELECTRICAL CATENARY

BACKGROUND OF THE INVENTION

Field of the Invention

The invention relates to a work vehicle for maintenance of an electrical catenary, including a vehicle frame supported on on-track undercarriages and a vehicle superstructure situated thereon, wherein a first grounding device is arranged at a first vehicle end, with regard to a longitudinal direction of the vehicle, and a crane having a vertically and transversely adjustable work platform is arranged at the opposite, second vehicle end.

A work vehicle of this type is already known from EP 0 667 316 A1. On a vehicle frame supported on on-track undercarriages are arranged a vehicle superstructure, a work platform mounted on a crane jib, and a catenary measuring bow. The latter can also be used for grounding the catenary.

According to EP 0 479 764 A1, a machine for controlling the catenary is known. This machine has two measuring devices in the shape of a measuring bow and a measuring frame.

SUMMARY OF THE INVENTION

It is the object of the present invention to provide a work vehicle of the type mentioned at the beginning with which it is possible to safely work on the catenary, without thereby compromising the manoeuvrability of the work platform in the process.

According to the invention, this object is achieved with a work vehicle of the specified kind by way of the features cited in the characterizing part of the main claim.

A work vehicle designed in this manner ensures optimal safety of the working personnel in case the catenary should be under electrical tension by mistake. According to regulations, the catenary or the relevant section must be grounded during work. On work vehicles, this is carried out by means of the measuring bow acting as a grounding device. When working on two adjacent sections of a catenary which are electrically separated from one another, the situation may arise that the measuring bow is located in a grounded section, but the work platform is already in the next section which is not grounded by the measuring bow. Should this section be under tension, the personnel would be in extreme danger. By means of an arrangement of a second grounding device according to the invention, said endangerment can be reliably precluded due to both sections being grounded.

Additional advantages of the invention become apparent from the dependent claims and the drawing description.

BRIEF DESCRIPTION OF THE SEVERAL VIEWS OF THE DRAWING

The invention will be described in more detail below with reference to embodiments represented in the drawing in which FIG. 1 shows a schematic side view of a work vehicle, FIGS. 2 and 3 show a grounding device in an enlarged detail view and a view in the longitudinal direction of the wagon, respectively.

DESCRIPTION OF THE INVENTION

Figure 4:
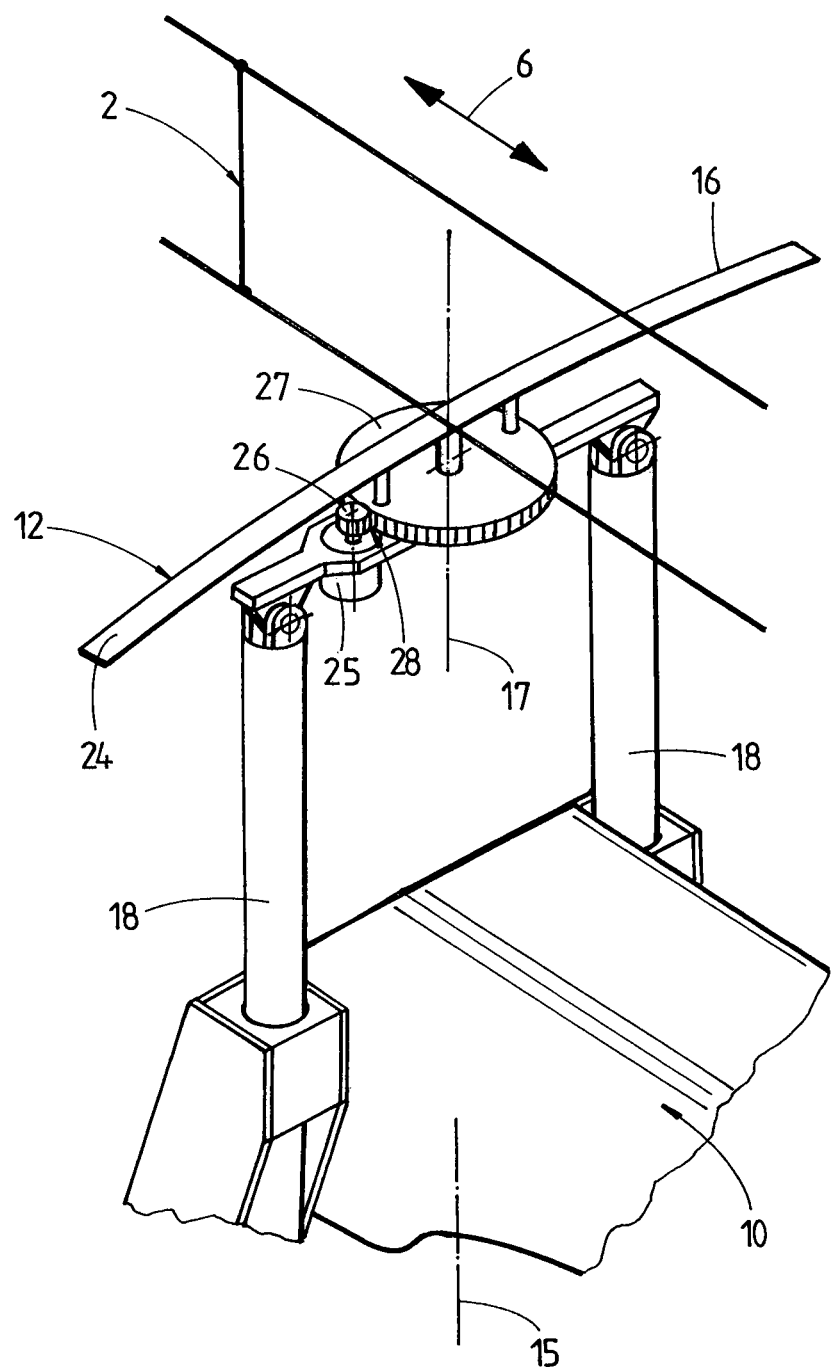
FIG. 4 shows a further embodiment of a grounding device.

A work vehicle 1, shown in FIG. 1, for maintenance of an electrical catenary 2 consists essentially of a vehicle frame 4, supported on on-track undercarriages 3, and a vehicle superstructure 5 situated on the former. A first grounding device 8 is arranged at a first vehicle end 7, with regard to a longitudinal direction 6 of the vehicle, and a crane 10 having a vertically and transversely adjustable work platform 11 is arranged at the opposite, second vehicle end 9. A second grounding device 12 is provided at the second vehicle end 9. The work platform 11 is designed to be vertically and transversely adjustable by means of drives 13 arranged on the crane 10. The crane 10 is connected to the vehicle frame 4 for rotation about a vertical axis of rotation 15 by means of a rotation drive 14.

As can be seen particularly in FIGS. 2 and 3, the second grounding device 12 arranged on the crane 10 is configured as a contact plate 16 which has a vertical axis of symmetry 17. The latter extends coaxially to the vertical axis of rotation 15 of the crane 10. The second grounding device 12, or the contact plate 16, is designed to be vertically adjustable by means of two drives 18 articulatedly connected to and guided on the crane 10. Advantageously, the contact plate 16 is configured as a circular sliding plate 19.

The contact plate 16 of the grounding device 12 shown in FIG. 4 is configured as a sliding strip 24 extending transversely to the longitudinal direction 6 of the vehicle. Said sliding strip 24 is designed to be rotatable about the axis of symmetry 17 relative to the crane 10 by means of a drive 25. The drive 25 is connected to a gear unit 28 having at least two gearwheels 26, 27. The sliding strip 24 is arranged at the gearwheel 27 which forms an output side of the gear unit 28. The drive 25 and the rotation drive 14 of the crane 10 are connected to a measuring—and controlling unit 20 (FIG. 1). Thus, the drive 25 is controlled automatically in such a way that—independently of the rotation of the crane 10—the sliding strip 24 always assumes a position perpendicular to the longitudinal direction 6 of the vehicle, or to the catenary 2.

Both the second grounding device 12 and the first grounding device 8 are connected to the measuring—and controlling unit 20. The first grounding device 8 is designed as a vertically adjustable measuring bow 21. Thus, the grounding devices 8, 12 can also be used for surveying the catenary 2.

The operation of the work vehicle 1 will now be described briefly. Before the work platform 11 is put into operation or entered by the working personnel, the two grounding devices 8, 12 are brought into contact with the catenary 2. Only then, work is allowed to commence. To enable effective working, it is necessary to move the work vehicle 1 forward with the work platform being extended and occupied. During this, it could happen that the work vehicle 1 is moved from a voltage-free and grounded first section 22 into a second section 23, adjoining the same, which is under electrical tension. In this case, an electrical short is established by the second grounding device 12, as a result of which the fuse in the substation is triggered and the second section 23 becomes voltage-free. Thus, there can be no endangerment of the personnel.

The invention claimed is:

1. A work vehicle for maintenance of an electrical catenary, the work vehicle comprising:
   first and second mutually opposite vehicle ends defining a longitudinal direction of the vehicle;
   on-track undercarriages;

a vehicle frame supported on said on-track undercarriages;

a vehicle superstructure disposed on said vehicle frame;

a first grounding device disposed at said first vehicle end;

a second grounding device disposed at said second vehicle end; and a crane disposed at said second vehicle end, said crane having a vertically and transversely adjustable work platform.

2. The work vehicle according to claim 1, wherein:

said crane has a vertical axis of rotation;

said second grounding device is constructed as a contact plate disposed on said crane; and said contact plate has a vertical axis of symmetry disposed coaxially to said vertical axis of rotation of said crane.

3. The work vehicle according to claim 2, wherein said contact plate is constructed as a circular sliding plate.

4. The work vehicle according to claim 2, wherein:

said contact plate is constructed as a sliding strip extending transversely to said longitudinal direction of the vehicle; and a drive rotates said sliding strip about said axis of symmetry relative to said crane.

5. The work vehicle according to claim 4, which further comprises:

a gear unit connected to said drive;

said gear unit having at least two gearwheels;

one of said gearwheels forming an output side of said gear unit; and said sliding strip being disposed at said gearwheel forming said output side of said gear unit.

6. The work vehicle according to claim 5, which further comprises:

a drive for rotating said crane; and a measuring and controlling unit connected to said drive for rotating said sliding strip and connected to said drive for rotating said crane.

7. The work vehicle according to claim 6, wherein said second grounding device is connected to said measuring and controlling unit.

8. The work vehicle according to claim 6, wherein said first grounding device is constructed as a vertically adjustable measuring bow connected to said measuring and controlling unit.

9. The work vehicle according to claim 1, which further comprises at least one drive for vertical adjustment of said second grounding device.

* * * * *